Figure 1:
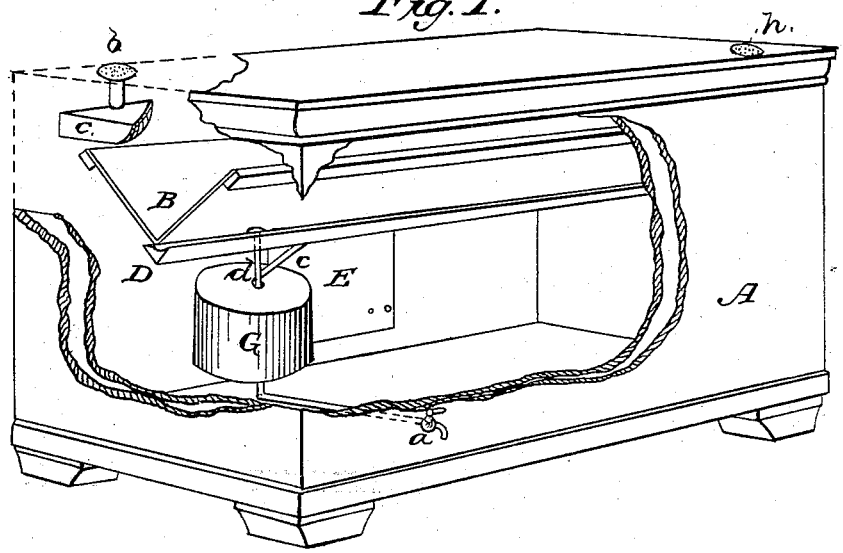

J. MARTIN.
Refrigerator.

No. 80,080.

Patented July 21, 1868.

WITNESSES:
P. T. Dodge
L. Hailer

INVENTOR:
John Martin
per Dodge & Munn.
attorneys

UNITED STATES PATENT OFFICE.

JOHN MARTIN, OF PHILADELPHIA, PENNSYLVANIA, ASSIGNOR TO HIMSELF AND JACOB JAMISON, OF SAME PLACE.

IMPROVED REFRIGERATOR.

Specification forming part of Letters Patent No. 80,080, dated July 21, 1868.

*To all whom it may concern:*

Be it known that I, JOHN MARTIN, of Philadelphia, in the county of Philadelphia and State of Pennsylvania, have invented certain new and useful Improvements in Refrigerators; and I do hereby declare that the following is a full, clear, and exact description thereof, reference being had to the accompanying drawings, making part of this specification, and to the letters of reference marked thereon, like letters indicating like parts wherever they occur.

To enable others skilled the art to construct and use my invention, I will proceed to describe it.

My invention consists of an ice-box or refrigerator of novel construction, to be used for the preservation of meats, fruits, vegetables, &c., and is intended either for family use or on a large scale by butchers, wholesale dealers, and others.

In the drawings, Figure 1 is a perspective view of my box with a portion broken away to show the interior construction.

In constructing my refrigerator I build a box, A, of suitable shape, (preferably rectangular,) provided in the top with a hinged lid or door, F, through which the ice is introduced, and provide on one side a door or doors, E, for gaining entrance to the interior of the body or box. The box A is constructed with double walls, as shown. The space between these walls may be left as an air-space or filled with sawdust, charcoal, or similar non-conducting substances, and inside, near the top of the chamber, is secured or suspended an inclined V-shaped trough, B, about one-half the width of the chamber, for holding the ice. This trough may extend from end to end of the chamber; or it may be attached to one end and stop short of the other; and it may be made of wood or of metal, or wood lined with metal.

Near one end of the trough B, and in the under side, I secure a metal pipe, $d$, for the purpose of conveying off the water resulting from the melting of the ice in the trough, the pipe passing down from the trough into the closed vessel G, as shown in the drawings. There is also another pipe attached to this vessel for the purpose of drawing off the water, which pipe passes through the wall of the box, and has a cock, $a$, attached on the outside. The moisture resulting from condensation and collecting on the outside of the trough would, if there were nothing to prevent it, run down on the outside and collect on the lower edge or side of the trough, and from thence drip down upon the articles of food in the chamber below. To obviate this I place underneath and close to the trough B another but much smaller trough, D, which is also connected with vessel G, either directly by emptying into a bell-mouth on the top of the vessel, or by a pipe, as in the drawings, so that all moisture collecting on the outside of B will run down into D, and by that will be conveyed into the vessel G.

For the proper ventilation of the box I place in its top two or more ventilators, $b$. These ventilators being above the level of the ice, all the air that enters must pass over or around it, thus thoroughly ventilating the chamber and at the same time keeping the temperature of the air in it nearly as low as that of the ice itself. Immediately under these ventilators $b$ (which in this case are in the corners) I secure the boxes or dishes C, intended to contain any substance that may tend to purify the air entering through $b$; or chemicals may be used that will impregnate the air with gases that will preserve the contents of the chamber from decay and putrefaction. These boxes may, if desired, be covered with wire-gauze, as are the ventilators, to prevent dirt or any foreign substance from getting into them.

A refrigerator constructed on this plan will be found to have many advantages over those now in use, as by placing my ice in an open trough in the upper part of the chamber, with the ventilators above it, I realize nearly the full effect of the ice, and by the use of the secondary trough to prevent the dripping of water from B, I keep everything below dry and free from moisture.

The water in the vessel G may be drawn off from time to time for use; or it may be emptied only when full.

In practice the boxes are lined with zinc, as shown in the drawings, or the wood finished with a coat of paint.

The trough B may be stationary or merely set into a stationary frame, so as to be removable for the purpose of cleaning.

The operation of my apparatus is as follows:

The top door, F, is opened, the ice introduced and placed in B, and the door closed, the proper materials placed in the boxes C, and it is ready for use.

All that is necessary to keep the box in order is to supply it with ice and chemicals as often as needed, and to see that the vessel G does not become filled with water and overflow.

Having thus described my invention, what I claim is—

The ice-box or refrigerator A, having the ice-trough B arranged along its center, with an open space on each side, with the drip-spout D located thereunder, and both connected with the reservoir G, and having the receptacles C, all arranged substantially as shown and described.

JOHN MARTIN.

Witnesses:
SAML. P. JONES, Jr.,
JOSEPH S. MAUL.